United States Patent [19]

Kajioka et al.

[11] Patent Number: 4,859,223
[45] Date of Patent: Aug. 22, 1989

[54] METHOD OF MANUFACTURING POLARIZATION-MAINTAINING OPTICAL FIBERS

[75] Inventors: Hiroshi Kajioka; Koudo Yamada; Yuuetsu Takuma; Tatsuo Teraoka, all of Hitachi, Japan

[73] Assignee: Hitachi Cable Limited, Tokyo, Japan

[21] Appl. No.: 141,364

[22] Filed: Jan. 5, 1988

[30] Foreign Application Priority Data

Jun. 15, 1987 [JP] Japan ............................. 62-148282
Dec. 7, 1987 [JP] Japan ............................. 62-307735

[51] Int. Cl.⁴ .................... C03B 37/027; C03B 37/018
[52] U.S. Cl. ...................... 65/3.12; 65/18.2
[58] Field of Search ............. 65/3.11, 3.12, 13, 18.2, 65/3.2

[56] References Cited

U.S. PATENT DOCUMENTS

| | | | |
|---|---|---|---|
| 4,274,854 | 6/1981 | Pleibel | 65/3.11 |
| 4,494,969 | 1/1985 | Bhagavatula | 65/3.12 |
| 4,578,097 | 3/1986 | Berkey | 65/18.2 |
| 4,629,485 | 12/1986 | Berkey | 65/18.2 |

FOREIGN PATENT DOCUMENTS 201937 11/1986 European Pat. Off. ............. 65/3.12

Primary Examiner—Kenneth M. Schor
Attorney, Agent, or Firm—Dykema Gossett

[57] ABSTRACT

Two opposite portions of the surface of a core rod whose section is circular are removed by machining in the longitudinal direction thereof, so that the section of the core rod is transformed into a non-circular shape. On the surface of the thusly shaped non-circular core rod, glass particulates are accumulated, and then the glass particulates accumulated on the core rod are sintered to create a preform. Then, the preform is heated and drawn, so that a polarization-maintaining optical fiber of non-circular section is obtained.

4 Claims, 5 Drawing Sheets

METHOD OF MANUFACTURING POLARIZATION-MAINTAINING OPTICAL FIBERS

BACKGROUND OF THE INVENTION

1. Field of the Invention

This invention relates to a method of manufacturing a polarization-maintaining optical fiber, and particularly a polarization-maintaining optical fiber which is suited for coherent communication.

2. Background Art

Generally, there are two kinds of polarization-maintaining optical fibers, namely a fiber including a circular core to which a stress is applied, such as an elliptical-jacket fiber, a PANDA fiber, a Bow-tie fiber, and another including a non-circular core, such as an elliptical core type and a rectangular-type core. In such polarization-maintaining optical fibers, the phase constant difference ΔB between natural crossed polarized modes is widened in order to suppress cross talk of these modes to a minimum, so as to obtain the property of polarization maintenance.

Prior methods of manufacturing polarization-maintaining optical fibers whose cores are not circular in section are respectively shown in FIG. 1 (Japanese Patent Laid Open No. 24306/81) and in FIG. 2 (Japanese Patent Laid Open No. 92505/81) of the accompanying drawings.

According to the method of FIG. 1, first, a base material 113 which includes a circular core 111, circular cladding 112, and a silica glass tube 121, whose central portion is a circular cavity and whose section is oval, are fabricated (FIG. 1-a). Next, the base material 113 is inserted in the silica glass tube 121, forming a combined body, and such combined body is heated from the outside, forming a preform 130 (FIG. 1-b). Then, the preform 130 is heated and wire-drawn, so as to create an optical fiber including a fiber jacket 143 whose outermost profile of this section s approximately circular due to surface tension, the sections of both the core 141 and the cladding 142 being elliptical (FIG. 1-c).

In such a manufacturing method, since the silica glass tube 121 is employed, its diameter is limited to a certain degree. Accordingly, neither a preform of large diameter nor a long optical fiber can be obtained, so that it is not suitable for mass production. Also, since the core 141 is transformed from a circle to an oval through the process of heating and wire drawing, the configurations of the core 141 and the cladding 142 are apt to vary with fluctuations of heating temperature and the viscosity of the glass. Hence, it is difficult to fabricate, with high organic efficiency, an oval core optical fiber of pre-designed configuration, and rendering the fibers of the same configuration is difficult, as well.

In the method shown in FIG. 2, first, a vitreous tube 201 and a core member 203 having a rectangular section and shaped by mechanically grinding a round glass bar are prepared (FIG. 2-a). Next, there is formed a vitreous cladding layer 202 on the inner surface of the vitreous tube 201 by means of CVD (Chemical Vapor Deposition) (FIG. 2-b). Then, the core member 203 is inserted and fixed in the glass tube 201 which has the vitreous cladding layer 202 inside thereof, with the core member 203 and the glass tube 201 being aligned (FIG. 2-c). After that, the glass tube 201 and the core member 203 are rotated together and heated from outside, with both of them being shrunk, so that the core member 203 and the vitreous cladding layer 202 are blended and combined, creating a preform 205 (FIG. 2-d). The thusly formed preform 205 is wire-drawn to form an optical fiber which has a shape similar to the preform 205.

In this method, like the previous one shown in FIG. 1, since the glass tube 201 is utilized, a limitation is imposed on the diameter of the preform, and the high-volume production capability is low. Furthermore, during the process of fabricating the preform by shrinking the glass tube 201, the core member 203 and the glass tube 201 both easily change their shapes, so that it is difficult to manufacture the desired optical fiber at high yield.

Another related method of manufacturing a polarizationmaintaining optical fiber of the elliptical core type is disclosed in the publication of Japanese Patent Laid Open No. 130044/79.

Even if the cross talk of the polarization-maintaining optical fiber is small, that is to say, if it has an excellent extinction ratio of, for example, −30 dB/km, in an actual case the extinction ratio deteriorates to some −10 dB/km after a 100 km transmission, so that the modes whose cross talk becomes high function as an echo to the main signal and are transmitted to the receiver. Therefore, the transmission quality is deteriorated.

In order to prevent the deterioration in the transmission quality, it has been suggested that the aforesaid stress-applied fiber and the non-circular core fiber be combined together, so as to compensate the propagation velocity difference between orthogonally crossed polarized modes because of multi-refractive indexes generated by the applied stress. However, no suitable method of manufacturing thereof has heretofore been available.

SUMMARY OF THE INVENTION

One object of this invention is to provide a method of manufacturing a polarization-maintaining optical fiber, whereby rendering and mass production of long fibers having a non-circular core are made easy.

Another object of this invention is to provide a method of manufacturing a polarization-maintaining optical fiber which does not deteriorate the transmission quality in a long-distance transmission.

In the method of fabricating the polarization-maintaining optical fiber of this invention, first, two opposite portions of the surface of a core rod whose section is round are cut away in the axial direction thereof by means of machining, so as to change the section of the core rod to a noncircular one.

The core rod is fabricated by VAD (Vapor Phase Axial Deposition) or the like. If the core is a vitreous rod, grinding is employed, while if the core rod is a soot-rod, the rod is cut by, for example, a cutter which has been previously heated to high temperature.

Next, on the non-circular surface of the core rod, particulates of glass are accumulated by OCVD (Outside Chemical Vapor Deposition) or VAD.

Then, the glass particulates accumulated on the core rod surface are sintered, being formed into transparent glass, thereby forming a preform. In this case, if necessary, both side surfaces of the preform are grinded or lengthened into a desired shape.

Finally, the preform undergoes heating and wire drawing, so as to form it into a fiber.

In this manner, a polarization-maintaining optical fiber is obtained having a core which is not circular in section. The wire drawing is performed so as to maintain a similar configuration of the preform.

In a sintering process where there is provided cladding around the core, and the core rod is made to be non-circular by removing some portions of the cladding through machining, when the glass particulates accumulated on the outer surface of the core rod are sintered, a shrinking force is imposed on the core rod. On the other hand, the core rod has been partially cut at two opposite portions of the surface in the longitudinal direction, that is to say, the core rod has already had a disymmetric section contribution, as well. Accordingly, the core and the cladding are ovals in the shape with the major axes being orthogonal.

By forming the cladding into an elliptical shape, the longitudinal direction of the core becomes the fast axis with regard to refractive index. On the other hand, since the core diameter is large, the length of the optical path becomes long. Thus, polarization dispersion between two orthogonal polarized modes, with proper parameters, will be substantially smaller than the optical fiber of the conventional type. Therefore, the pulse width expansion will be reduced, enabling wide-band transmission. In other words, even if the the extinction ratio deteriorates during long-distance transmission, accompanying some transmission loss the generation of pulse echo is suppressed, so that the overall deterioration of transmission quality is prevented.

DETAILED DESCRIPTION OF THE PREFERRED EMBODIMENT

Figure 1A:
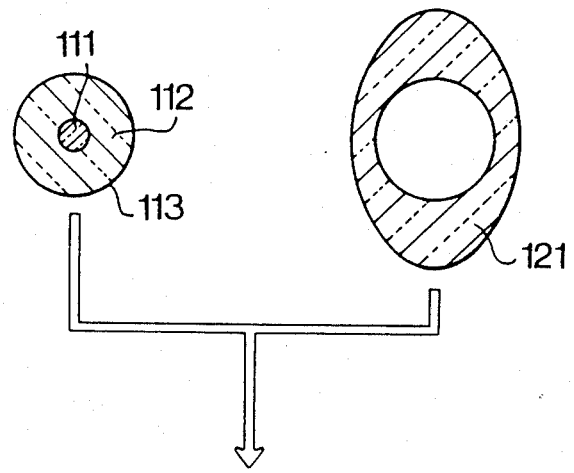
FIGS. 1 (a)-(c) and 2 (a)-(d) are process drawings, each showing the steps of a method of manufacturing polarization-maintaining optical fibers of the prior art.
Figure 1B:
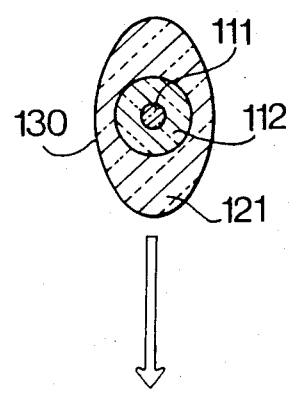
Figure 1C:
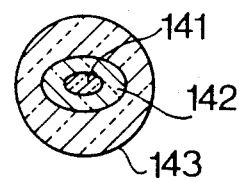
Figure 2A:
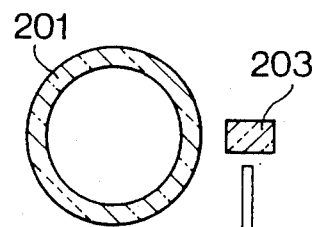
Figure 2B:
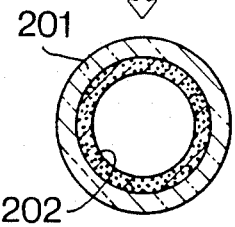
Figure 2C:
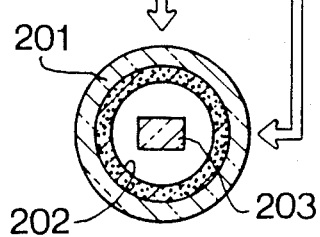
Figure 2D:
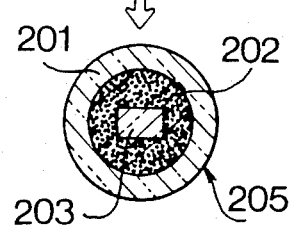
Figure 3A:
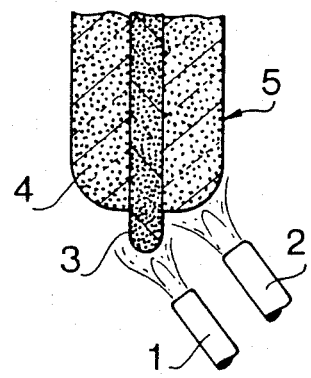
FIGS. 3 (a)-(d) are process drawings showing the steps of the method of manufacturing the polarization-maintaining optical fiber of the present invention.
Figure 3B:
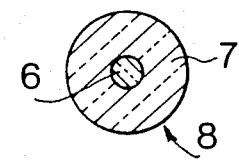
Figure 3C:
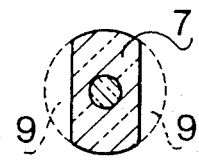
Figure 3D:
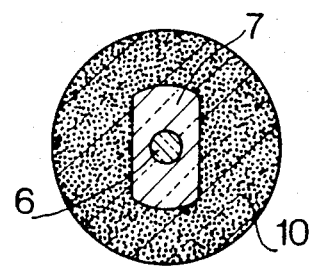

Preferred embodiments of this invention will now be described in accordance with the accompanying drawings.

FIG. 3 shows a process drawing of a polarization-maintaining optical fiber according to the first embodiment of this invention.

First, $GeCl_4$ and $SiCl_4$ are supplied from a core burner 1 at amounts of 20 mg/min and 800 mg/min, respectively, while only $SiCl_4$ at 5 g/min is supplied from a cladding burner 2. Glass particulates are accumulated by VAD, forming a porous base material 5 constituted by a core 3 of 30 mm in diameter and cladding 4 of 120 mm in diameter (FIG. 3-a).

Next, this porous base material 5 is sintered so as to be transformed to a vitreous one, in an environment of $SiF_4$ at 170 ml/min and He at 10 l/min, thereby forming a core rod 8 of 60 mm in diameter and the cladding 7 (FIG. 3-b). At this time, fluorine is supplied in a manner such that the specific refractive index of the cladding 7 is decreased by approximately 0.22% in comparison with silica.

After that, the vitreous core rod 8 is lengthened to a diameter of 25 mm, two opposite sides 9 of the cladding 7 are mechanically ground some 970 mm in the axial direction thereof, and the thusly formed surface is abraded by a grinder to 25 mm×12 mm in section and fire-polished by an oxyhydrogen burner at a temperature of 1500 degrees C (FIG. 3-c).

Then, around the core rod 8, $SiO_2$ glass particulates are vapor-deposited from outside to form a support (FIG. 3-d) and are sintered at 1500 degrees C. so as to become vitreous. This process is repeated again to achieve a diameter of 300 mm, i.e., at first, the outside vapor deposition is conducted until the diameter of the core rod reaches 1.5 times the original diameter and drawing is conducted until the diameter is reduced to 30 mm, and then another outside vapor deposition is performed until the thusly formed core rod is 1.8 times the original diameter and is lengthened to 30 mm in diameter.

Figure 4:
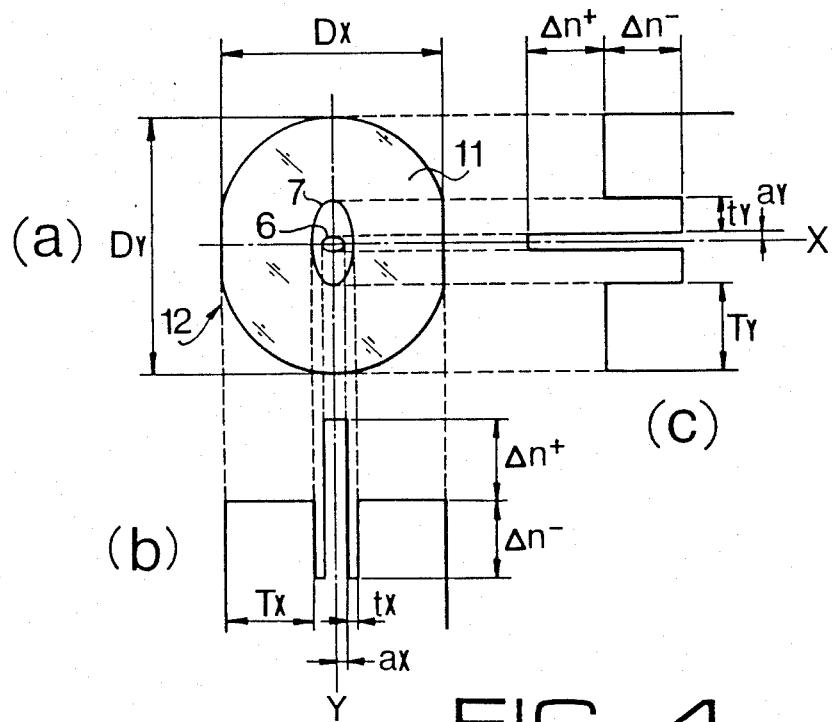
FIG. 4 is a view showing a section of a preform of FIG. 3 and refractive index contributions in X an Y axis directions.
Figure 5:
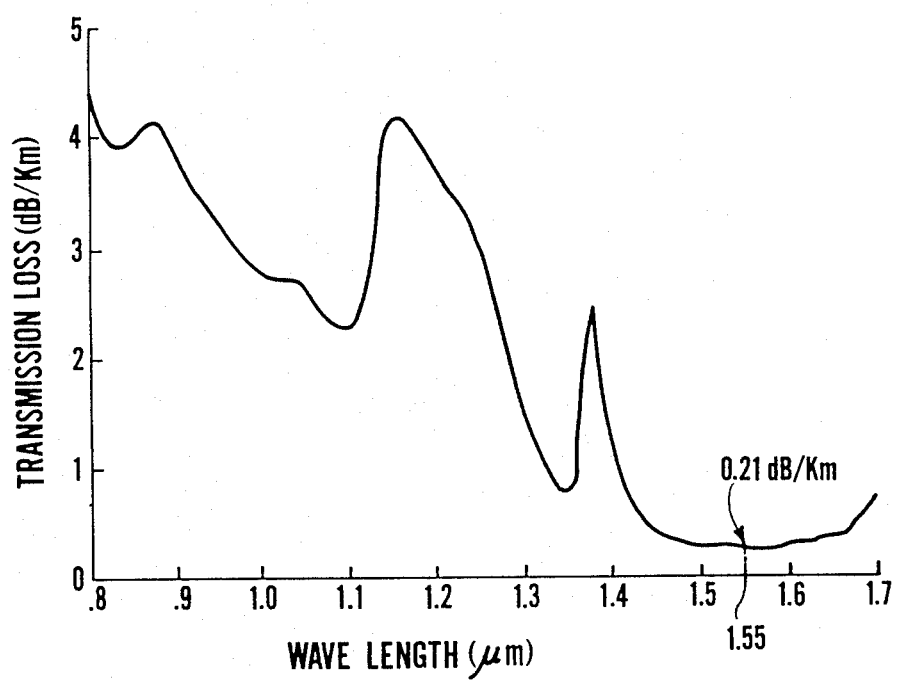
FIG. 5 is a diagram showing the relationship between wavelength and transmission loss of an optical fiber which is formed by heating and drawing the fiber of FIG. 4.
Figure 6A:
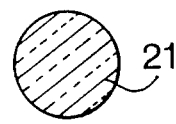
FIGS. 6 (a)-(e) are process drawings showing the steps of a method of manufacturing the polarization-maintaining optical fiber of another embodiment of this invention.
Figure 6B:
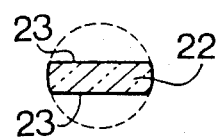
Figure 6C:
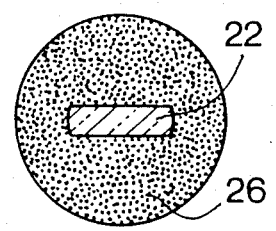
Figure 6D:
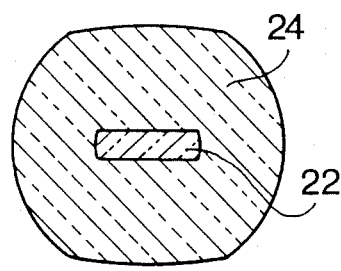
Figure 6E:
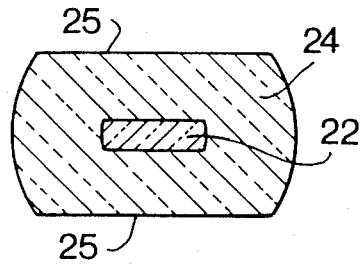

In this manner, a preform 12 which comprises the core 6, the cladding 7 and the support 11 is created, as shown in FIG. 4-a. here, during sintering of the glass particulates 10, a shrinkage force works on the core 6 and the cladding 7, shaping them into ovals, in a manner such that they have orthogonal major axes.

The refractive index distributions of this preform 12 in the X and Y directions were examined by means of a preform analyzer, and the results are shown in FIGS. 4-b and 4-c. They depict that the specific refractive index difference $\Delta hd\ n^+$ of the cladding 7 compared with the silica is -0.22%. This means that fluorine was also added to the core 6.

In the X axis, the diameter Dx is 29.5 mm; cladding width tx/core radius ax is 1.0; and support width Tx/core radius ax is 6.4; while in the Y axis direction, the diameter Dy is 30.7 mm, cladding width tY core radius aY is 3.4; and support width TY/core radius a Y is 9.0.

A polarization-maintaining optical fiber is formed finally by heating at 2100 degrees C. and wire drawing at 20 gf the preform to the diameter of 150 μm. FIG. 3 shows the examination result of 1000 m fiber of the above-mentioned type in lossed-wave length performance.

In the figure, the cut-off wavelength is 1.35 μm, the transmission loss is 0.21 dB/km at a wavelength of 1.55 μm, and the coupling length is 17 mm. Ellipticities of the core and the cladding are both some 35%.

In this particular embodiment, the core is not directly shaped into an oval, and $GEO_2$ of high density is not applied to the core when the core is being formed to an oval, so that low loss is obtained in transmission.

And, since the dispersion between two perpendicularly crossed polarized modes (polarization dispersion) is also small, this optical fiber can be utilized as a transmission path for coherent communication.

In an actual manufacturing according to the above embodiment, by supplying $GeCl_4$ at a rate of 100 mg/min and $SiCl_4$ at 800 mg/min, which are doped to the core 6 of the porous base material 5 as much as some 1%, and increasing the depth of grinding of the core rod 8 so as to shape the section to 25 mm×9 mm, a polarization-maintaining optical fiber having a coupling length on the order of several mm was achieved.

Another embodiment of this invention will now be explained with reference to FIG. 6. In FIG. 6-a, numeral 21 designates a core rod whose diameter is 200 mm and which will be a central element. It is made of silica glass doped with Ge of approximately 10 mol % and formed by VAD.

Two opposite portions of the core rod 21 are ground to 20 mm×mm in section in the longitudinal direction thereof, as shown in Figure 6-b, forming the core 22. Numeral 23 designates the grinded surfaces.

To the core 22, which has a rectangular section, cladding sot 26 of pure silica is vapor-deposited from outside by CVD or VAD, so that the diameter thereof becomes 120 mm, and then it is transformed to a vitreous state, forming cladding 24 having a diameter of 60 mm (FIG. 6-d). The processes of vapor deposition of cladding soot and of transforming it to a vitreous state can be repeated again.

After that, the cladding is shaped into a base material by grinding the cladding at two opposite portions of the surface, so as to be shaped into a configuration analogous to the core 22 as shown in FIG. 6-e. Numeral 25 denotes the ground surfaces.

Then, the thusly formed base material is drawn at a tensile force of 50–60 g, while maintaining the configuration analogous to the one before drawing. By coating silica, ultraviolet hardening resin or the like onto the wire-drawn base material, a primary coated fiber is obtained. The wiredrawing is performed in a manner such that the core meets the requirement of single mode in terms of diameter.

In this embodiment, it is permissible that the cladding 24 contains dopant such as fluorine.

According to the above-mentioned embodiment, it is possible to manufacture at high yield a polarization-maintaining optical fiber including the core and the cladding which are formed into non-circular sections, respectively, as a transmission path between optical integrated circuits.

Also, since chemical vapor deposition such as VAD and machining are both employed, the base material can be made in large scale, resulting in cost reduction.

Moreover, since machining is utilized in manufacturing, the ellipticity of the core can be set to a high value, so that the double refractive index can be high, improving the polarization-maintaining characteristics.

What is claimed is:

1. A method of manufacturing a polarization-maintaining optical fiber, comprising the steps of:
   (A) fabricating a core rod having a longitudinal axis by vapor phase axial deposition and sintering;
   (B) removing portions of the core rod by machining said core rod at two opposite surface positions thereof so that the core rod possesses opposite flat surfaces which extend along the longitudinal direction thereof;
   (C) depositing cladding soot around the core portion and vitrifying the cladding soot to form cladding surrounding the core rod, the core portion and cladding defining a core rod having a circular cross-section;
   (D) grinding two opposite surfaces of the cladding along the longitudinal direction of the core rod, such that the sectional configuration of the cladding and the core portion are large and small scale analogs of each other in shape; and
   (E) wire-drawing the core rod fabricated in step (D) into said polarization-maintaining optical fiber 2. The method of claim 1, further including the step of applying a coating of silica on the wire-drawn core rod fabricated in step (E).

3. The method of claim 1, further including the step of applying a coating of ultraviolet hardening resin on the wire-drawn core rod fabricated in step (E).

4. The method of claim 1, wherein said step (C) is repeated and therafter said step (D) is carried out.

* * * * *